US 8,589,016 B2

(12) United States Patent
Bange et al.

(10) Patent No.: US 8,589,016 B2
(45) Date of Patent: Nov. 19, 2013

(54) MOTOR VEHICLE MONITORING APPARATUS AND ASSOCIATED METHOD FOR CONTROLLING THE ELECTRIC CURRENT OF AN ACTUATOR

(75) Inventors: Paul Bange, Regenstauf (DE); Malte Jacobi, Tegernheim (DE); Bernd Meier, Postbauer-Heng (DE); Matthias Peuckert, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 564 days.

(21) Appl. No.: 12/667,925

(22) PCT Filed: Jun. 26, 2008

(86) PCT No.: PCT/EP2008/058185
§ 371 (c)(1),
(2), (4) Date: Jan. 6, 2010

(87) PCT Pub. No.: WO2009/007249
PCT Pub. Date: Jan. 15, 2009

(65) Prior Publication Data
US 2010/0204871 A1    Aug. 12, 2010

(30) Foreign Application Priority Data

Jul. 10, 2007    (DE) .................. 10 2007 032 178

(51) Int. Cl.
*G01M 17/00*    (2006.01)
(52) U.S. Cl.
USPC ............................ 701/29.1; 375/238; 701/36

(58) Field of Classification Search
USPC .......................... 701/29, 36, 41, 42; 375/238
See application file for complete search history.

(56) References Cited

U.S. PATENT DOCUMENTS

| 5,311,548 | A | * | 5/1994 | Nikolaus ..................... 375/238 |
| 5,790,364 | A | * | 8/1998 | Mikami et al. ............... 361/154 |
| 6,366,038 | B1 | | 4/2002 | Boehm |

(Continued)

FOREIGN PATENT DOCUMENTS

| DE | 4109233 A1 | 9/1992 |
| EP | 0743585 A1 | 11/1996 |
| JP | 07229576 A | 8/1995 |
| JP | 7116974 B | 12/1995 |

(Continued)

*Primary Examiner* — Thomas Black
*Assistant Examiner* — Shardul Patel
(74) *Attorney, Agent, or Firm* — Laurence A. Greenberg; Werner H. Stemer; Ralph E. Locher

(57) ABSTRACT

A motor vehicle monitoring apparatus has a controller as a component of a control loop for controlling the electric current of an actuator. The vehicle power supply system voltage of a motor vehicle voltage source is applied to the actuator. A correction unit is provided in the forward path of the control loop between the controller and a subordinate actuator element of the control loop and applies the actuation signal output by the controller with a correction factor which is proportional to the reciprocal value of the instantaneous vehicle power supply system voltage.

20 Claims, 4 Drawing Sheets

(56) References Cited

U.S. PATENT DOCUMENTS

| | | |
|---|---|---|
| 6,456,946 B1 * | 9/2002 | O'Gorman ............... 702/58 |
| 7,009,402 B2 * | 3/2006 | Yumoto et al. ........... 324/433 |
| 7,596,442 B2 * | 9/2009 | Aigner et al. ............ 701/42 |
| 7,970,512 B2 * | 6/2011 | Lu et al. ................. 701/41 |
| 2007/0188948 A1 * | 8/2007 | Morita .................. 361/42 |
| 2007/0201176 A1 * | 8/2007 | Yokai et al. ............. 361/103 |
| 2007/0265746 A1 * | 11/2007 | Fulks et al. ............. 701/36 |
| 2008/0116858 A1 * | 5/2008 | Steiner ................. 322/25 |

FOREIGN PATENT DOCUMENTS

| | | |
|---|---|---|
| JP | 8312830 A | 11/1996 |
| JP | 2001524799 A | 12/2001 |
| JP | 200693537 A | 4/2006 |

* cited by examiner

Without inverse disturbance variable feedforward 0 corresponds to 0% (12 bit)
4096 corresponds to 100% (12 bit)

FIG. 4A With inverse disturbance variable feedforward

MOTOR VEHICLE MONITORING APPARATUS AND ASSOCIATED METHOD FOR CONTROLLING THE ELECTRIC CURRENT OF AN ACTUATOR

BACKGROUND OF THE INVENTION

Field of the Invention

The invention relates to a motor vehicle control device having a controller as a component of a control loop for controlling the electric current of an actuator, wherein the electrical system voltage of a motor vehicle voltage source is applied to the actuator.

For e.g. a transmission, in particular an automatic transmission, in a motor vehicle, a coupling for selecting and shifting gears is hydraulically actuated as a hydraulic device. Other hydraulic devices used in a motor vehicle are also, for example, brakes for linking or locking shafts or pressure controllers for fuel injection systems, the hydraulic actuation of the particular hydraulic device taking place such that, in the latter, the flow rate for a hydraulic medium, in particular a fluid, and therefore its hydraulic pressure are set by at least one actuator, in particular a so-called solenoid control valve, using a preferably digital control loop. The flow rate for the fluid through e.g. a solenoid control valve as an actuator is dependent on the coil current flowing through the valve and is adjusted by a current controller. For this purpose there is provided in the feedback path of the control loop a sensing element or sensor with the aid of which the actual current through the solenoid control valve is determined and fed to the input of the preferably digital controller, in particular a PID controller. On the basis of a stored set of characteristics of the solenoid control valve, the hydraulic pressure of the hydraulic medium in the hydraulic device to be actuated can be inferred from the measured current through the solenoid control valve.

In practice, a motor vehicle's on-board electrical system voltage or supply voltage may be unstable. In particular, various factors can cause it to fluctuate by as much as several volts. These fluctuations in the vehicle's electrical system supply voltage may also be transmitted to the current flowing through the respective actuator for the hydraulic device, in particular through the respective solenoid control valve, resulting in disturbances being applied to the controlled variable of this control loop. The control loop reacts to these disturbances with corrective action, so that these disturbances cannot be corrected again by the controller until after a particular time interval. This means that in practice the setting and maintaining of a particular desired current value for the actuator, in particular a coil current value for the solenoid valve, preferably a solenoid control valve, is impaired or made more difficult. In particular, unfavorable periodic frequencies (resonant frequencies) of the coil current disturbances caused by vehicle electrical system supply voltage fluctuations may result in unwanted oscillation or even resonance of the actual current, i.e. the output-side controlled variable of the current controller or actuator. This can even lead to instability of the control loop.

In the case of the digital control loop of JP 072 295 76 A, to control the current of a solenoid valve on the basis of battery voltage changes, the integration constant and the proportionality constant of the controller of said digital control loop are changed with the aid of controller parameter values stored in a table. Adjustment of the controller parameters is possible to limited extent, i.e. in more or less large steps, depending on the size of the table. However, a disturbance in the controlled current of the solenoid control valve in the event of any sudden unwanted change in the vehicle's electrical system voltage may still occur. This previous attempt to counteract any vehicle electrical system voltage fluctuations merely by variably adjusting the controller parameters such as KP, KI, KD of the controller e.g. by software or hardware does not prevent the controller from still attempting to correct disturbances in its deviation signal caused by fluctuations in the vehicle electrical system voltage. Moreover, a parameter set optimized for very low battery voltages could result in unwanted effects, particularly even in instabilities, if the battery voltage quite suddenly increases unexpectedly and unintentionally. In terms of the controller parameters, this approach therefore requires a compromise in their selection in order to ensure sufficient stability. However, this is at the expense of the dynamic response and therefore the performance and convenience of the control loop.

For improved setting of the electrical current of an actuator, the object of the invention is to provide a motor vehicle control device having a controller as a component of a control loop, said control device being largely robust to fluctuations in the vehicle electrical system supply voltage.

BRIEF SUMMARY OF THE INVENTION

This object is achieved for a motor vehicle control device of the type mentioned in the introduction by providing, in the forward path of the control loop between the controller and a downstream actuating element of the control loop, a correction unit which causes a correction factor proportional to the reciprocal of the instantaneous vehicle electrical system voltage to be applied to an actuating signal output by the controller.

By providing in the forward path of the control loop, between its controller and its actuating element, a correction unit with which a correction factor proportional to the reciprocal of the instantaneous, i.e. currently present, vehicle electrical system voltage is applied to the actuating signal output by the controller, negative effects of vehicle electrical system voltage changes, in particular vehicle electrical system voltage fluctuations, on the control action of the control loop are largely prevented, i.e. "caught" from the outset, the correction applying a kind of "inverse disturbance variable feedforward" to the manipulated variable of the controller so that any changes in the vehicle electrical system voltage, in particular vehicle electrical system voltage fluctuations or vehicle electrical system voltage ripple which could be reflected in disturbances in the controlled variable of the controller and in the manipulated variable of the actuating element of the control loop, are largely compensated directly before they can have impermissibly negative effects on the switching performance of the actuator. The setting of a desired current value for the respective actuator is therefore largely independent of the voltage level of the vehicle electrical system voltage. In this way, unwanted adjustments or mis-settings of the electric current for the actuator, in particular a solenoid valve, are largely prevented. The "inverse manipulated variable feedforward" enables the correction unit to instantaneously compensate any disturbance or more specifically fluctuation occurring in the vehicle electrical system voltage. It is therefore only marginally necessary or even no longer necessary for the digital controller to intervene at all in the event of a vehicle electrical system voltage change, in particular a suddenly occurring vehicle electrical system voltage fluctuation. By the correction unit between the controller and the actuating element of the control loop causing a correction factor proportional to the inverse of the currently present vehicle electrical system voltage to be applied to the actuating signal output by the controller, the control loop can be made largely robust, i.e. stable, to changes in the vehicle electrical system voltage, in particular to vehicle electrical system voltage ripple or fluctuations. At the same time, a high dynamic response for rapid correction of wanted jumps in the setpoint current characteristic of the actuator—e.g. in particular of a solenoid control valve—can be achieved.

A fast response of the control loop is advantageous in practice particularly for transmissions, preferably automatic transmissions. In the case of automatic transmissions, for example, a fast controller response is required particularly during gearshifts involving a step-change setpoint current characteristic. The control device according to the invention can be implemented in particular as a transmission (open-loop) control, preferably as an automatic transmission (open loop) control, with high standards of ride comfort in terms of the execution speed of desired shifting operations while simultaneously meeting high standards in terms of insensitivity to abrupt and/or undesirably large fluctuations in the vehicle's electrical system voltage or other changes in the vehicle's electrical system voltage. However, it can also be advantageously applied to other automotive actuators, in particular PWM current (closed loop) controlled or PWM current (open loop) controlled actuators.

This is because on the one hand the control loop can advantageously react highly dynamically, i.e. with rapid corrective action, e.g. to a wanted change in the setpoint current. On the other hand, in the steady-state condition, i.e. with minimal changes in the level of the setpoint current, it advantageously remains largely stable or robust to vehicle electrical system voltage ripple or fluctuations. Expressed in general terms, the step response of the controller is therefore largely independent of the battery voltage value.

It is now no longer necessary, as was the case in JP 072 295 76 A, to adjust controller parameters such as e.g. the integration constant and the proportionality constant of the controller to any vehicle electrical system voltage change occurring in order to retain an optimum step response. In general terms, a set of controller parameters once optimized can therefore advantageously always remain the same. It is no longer necessary to amend the controller parameters in the case of dynamic changes in the vehicle electrical system voltage or continuous changes in the vehicle electrical system voltage.

The invention therefore relates to a method for controlling the current of an actuator by means of a controller of a motor vehicle control device as a component of a control loop, wherein the on-board electrical system voltage from a motor vehicle voltage source is applied to the actuator, said method being characterized in that a correction factor proportional to the reciprocal of the instantaneous vehicle electrical system voltage is caused to be applied to the actuating signal output by the controller of the control loop by means of a correction unit provided in the forward path of the control loop between the controller and a downstream actuating element of the control loop.

Other developments of the invention are set forth in the sub-claims.

The invention and its developments will now be explained in greater detail with reference to the accompanying drawings in which:

BRIEF DESCRIPTION OF THE SEVERAL VIEWS OF THE DRAWING

Elements with identical function and mode of operation are denoted by the same reference characters in FIGS. 1 through 4.

FIG. 1 schematically illustrates a transmission control system TC with its various components as an example of current control of an actuator in a motor vehicle. It comprises as a motor vehicle control device or more precisely open-loop control unit in particular a transmission control unit CON. The latter can in particular be embodied as an automatic-transmission control unit. It is used to set the flow rate Q of a hydraulic medium, in particular a hydraulic liquid or fluid, in a coupling CL for a transmission TR by means of an electrohydraulic actuator. The electrohydraulic actuator has as its main component a solenoid valve, in particular a solenoid control valve MAV. The coupling CL and the transmission TR are here combined into one hydraulic device HP in the exemplary embodiment shown in FIG. 1. By setting the coil current AI of the solenoid control valve MAV, its armature AN in an actuating cylinder is immersed at varying depths in the volumetric flow Q of the hydraulic device HP. To simplify the drawing, the armature AN is merely indicated by an arrow in FIG. 1. The coil current AI of the solenoid control valve MAV is assigned a particular hydraulic pressure of the volumetric flow Q in the hydraulic device HP via its set of characteristics.

Figure 1:
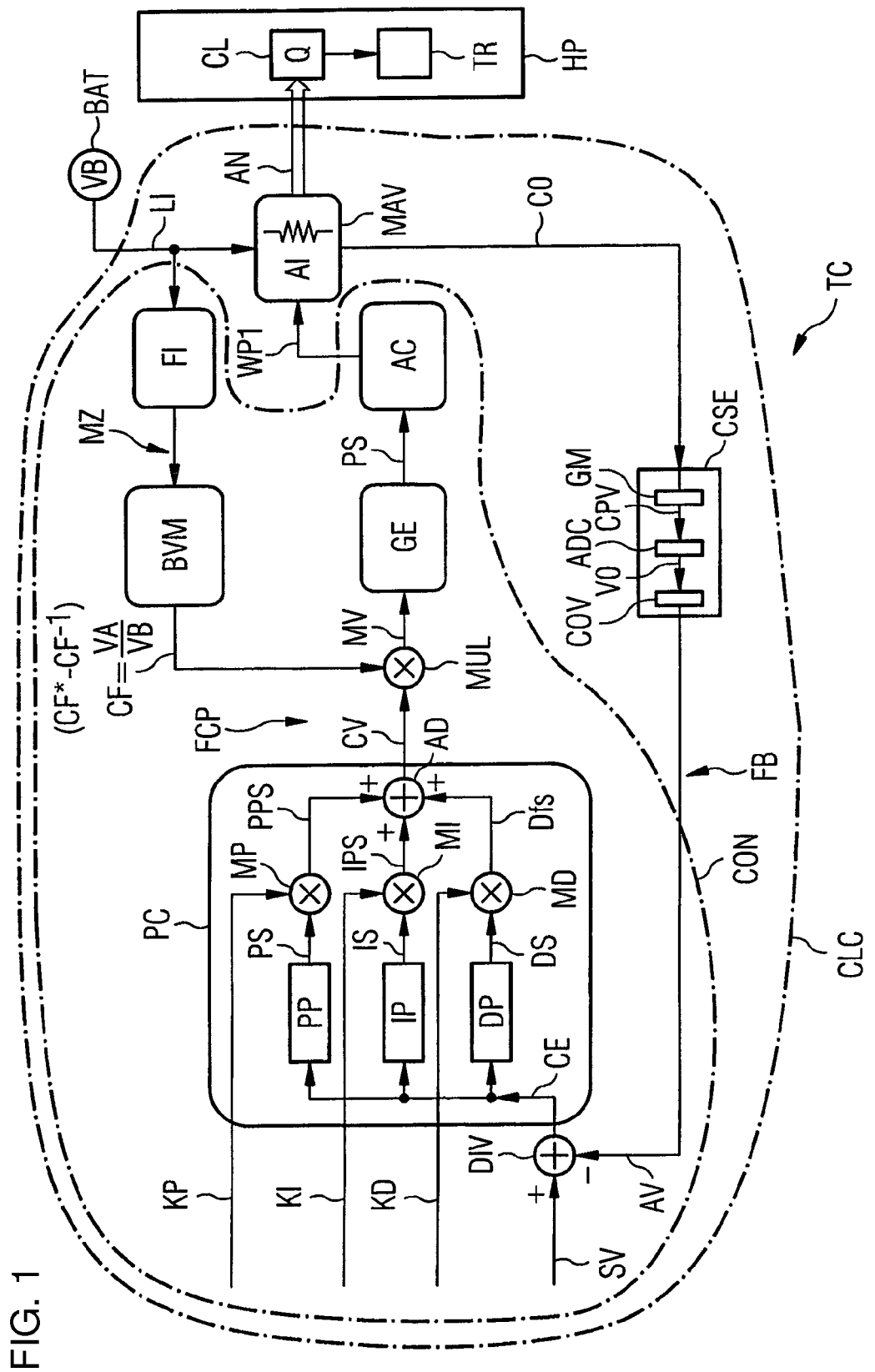
FIG. 1 schematically illustrates, as an exemplary embodiment of a motor vehicle control device according to the invention, a transmission control unit whose (closed-loop) controller in the control loop for a motor vehicle transmission is used to set the coil current of a solenoid control valve, wherein a correction factor proportional to the reciprocal of the instantaneous vehicle electrical system voltage is applied to the output manipulated variable of the controller of the transmission control unit of FIG. 1 or FIG. 2 by means of an additional correction unit, FIG. 2 schematically illustrates a variant of the control loop of FIG. 1 with equivalent circuit diagrams of individual components.

In order to adjust the coil current AI of the solenoid control valve MAV to a particular, preferably largely constant setpoint current characteristic as a function of time for a desired switching duration, accompanied by a desired pressure characteristic as a function of time of the volumetric flow Q of the hydraulic device HP for this switching duration, the transmission control unit CON has a digital dynamic controller, in this exemplary embodiment in particular a PID controller PC. The latter is disposed in the forward path FCP of a digital control loop CLC of the transmission control system TC and is connected on the output side via an actuating element AC to the control input of the solenoid control valve MAV. On the input side, it is connected to a measuring output of the solenoid control valve MAV via a feedback path FB of the digital control loop CLC. In the feedback path FB, said measuring output is connected to a current measuring device CSE. The current measuring device CSE is preferably disposed at the location of the solenoid valve MAV. In particular, it can also be combined with the solenoid valve MAV to form a single unit. Alternatively, it can also be advantageously embodied as a sub-component in the transmission control unit CON. It comprises a measuring element or sensor GM for current measurement. In this exemplary embodiment, the sensor GM is constituted in particular by an electronic current measuring device which determines a respective voltage CPV present dropped across a precision resistor, in particular a shunt resistor in the electrical circuit of the solenoid control valve MAV, as a measure of the actual current AI flowing in the electromagnetic coil device of the solenoid valve MAV. The current CPV measured is then digitized by means of a downstream AD converter ADC of the current measuring device CSE. The digital voltage values VO at the output of the AD converter ADC are fed to a following conversion unit COV of the current measuring device CSE which converts the measured voltage values CPV into associated digital actual current values AV in accordance with Ohm's law. These discrete measured actual current values AV are then fed back as measured controlled variable signals to a subtractor DIF at the input of the forward path FCP of the digital control loop CLC. By means of said subtractor DIF, the difference between a desired setpoint current characteristic SV (command variable signal) and the measured actual value current characteristic AV (measured controlled variable signal) is determined as a deviation signal CE. Said desired setpoint current characteristic SV is predefined on the input side as a command variable signal by means of a vehicle component (not shown) in order to produce in the hydraulic device HP a desired hydraulic pressure characteristic for the hydraulic medium there which corresponds to the current caused to flow in the solenoid control valve MAV. From the deviation signal CE, the digital controller PC generates an output-side digital manipulated variable signal CV. For this purpose the input-side digital deviation signal CE is processed in the PID controller PC by a proportionality or P-component PP, an integration or I-component IP, and a differential or D-component DP in separate parallel processing branches or paths. Specifically, the P-component PP outputs a P-signal component PS which is multiplied in a downstream multiplier MP by a controller parameter KP as a scaling factor for setting or rather adjusting the controller characteristic in respect of the proportion component so that a modified P-signal component PPS is generated. Similarly, in the downstream multiplier MI, an assigned controller parameter KI for influencing the controller characteristic in respect of the I-component is applied as a scaling factor to an I-signal component IS which is output by the I-component IP and a modified I-signal component IPS is produced. Also a D-signal component DS which is output by the D-component DP is multiplied in a downstream multiplier MD by a controller parameter KD as a scaling factor for adjusting a desired controller characteristic in respect of the D-component and a modified D-signal component DPS is provided. The controller parameters KP, KI and/or KD advantageously make it possible for the control action of the PID controller PC to be variably set. The signal components PPS, IPS, DPS modified in this way are finally cumulatively combined in the PID controller by means of an adder AD to produce the digital manipulated variable signal CV which is provided at the output of the digital controller PC. The digital manipulated variable signal CV is used to control an electric actuating element AC which acts on the control input of the solenoid control valve MAV by means of control signals WP1 to adjust the solenoid control valve MAV to a particular desired setpoint current characteristic SV. In this exemplary embodiment, the actuating element AC comprises in particular a driver stage or output stage OS and a freewheel diode FD. The electrical equivalent circuit diagrams of the output stage OS and the freewheel diode FD are shown schematically in FIG. 2. The electric actuating element AC preferably constitutes a component of the control unit CON. From the actuating element AC, at least one corresponding control line is then expediently run to the solenoid valve MAV. Alternatively, however, it can also be disposed at the location of the electrohydraulic solenoid control valve MAV in the motor vehicle. Preferably the hydraulic part of the solenoid control valve MAV together with the hydraulic device HP constitutes the process to be controlled in the controlled system of the control loop CLC. This is characterized or modeled in FIG. 2 as an electrical equivalent circuit diagram with an inductive and resistive load LO.

In order to be able to control the electrical actuating element AC in the case of an analog output stage OS, the digital manipulated variable signal CV is expediently converted into a pulse width modulated manipulated variable signal PS by means of a PWM generator GE which is disposed in the forward path FCP of the digital control loop CLC between the digital controller PC and the actuating element AC, the digital controller PC, the PWM generator GE, the correction unit MUL, and the subtractor DIF being expediently implemented as functional components of the digital control loop CLC in the motor vehicle control unit.

The electrical system voltage VB of a vehicle voltage source BAT is applied via a vehicle electrical system voltage line LI to the solenoid control valve MAV as the operating voltage. The freewheel diode FD is in particular connected in parallel to the load LO such that it is reverse-biased by the vehicle electrical system voltage VB. The vehicle voltage source BAT is constituted in particular by a vehicle battery. In order now to be able to largely ensure that a desired coil current AI can be set and maintained that is largely robust, i.e. as unaffected as possible by any fluctuations occurring in the vehicle electrical system voltage VB, there is provided in the forward path FCP of the digital control loop CLC, between its digital controller PC and its actuating element AC, a correction unit MUL which applies a correction factor or compensation parameter CF proportional to the reciprocal instantaneous, i.e. currently present, vehicle electrical system voltage VB to the actuating signal CV output by the controller PC. Said correction unit MUL is provided upstream of the PWM generator in the forward path FCP and therefore acts on the digital manipulated variable signal CV which is output by the digital controller PC.

In order to determine the correction factor CF, the vehicle electrical system voltage line LI for the solenoid control valve MAV is tapped using a measuring path MZ and the currently present i.e. instantaneous vehicle electrical system voltage VB is determined using a voltage measuring device BVM. The voltage measuring device BVM additionally calculates the correction factor CF according to relation $$CF = \frac{VA}{VB},$$

where VA is a proportionality factor corresponding to the vehicle electrical system voltage VB at the operating point of the digital control loop CLC for which the controller parameters KP, KI, KD of the digital controller PC are set in an optimized manner. The correction unit MUL is preferably implemented as a multiplier and then multiplies the digital manipulated variable signal CV by said correction factor $$CF = \frac{VA}{VB}$$

so that a corrected digital manipulated variable signal MV is generated. In the present exemplary embodiment, this modified digital manipulated variable signal MV is fed to the input of the PWM generator GE.

The voltage measuring device BVM is preferably preceded by a filter, in particular a lowpass filter FI which filters out disturbance frequencies of the vehicle electrical system voltage VB above the PWM frequency of the PWM generator GE. In particular, the lowpass filter FI can be an integral part of the voltage measuring device BVM. The voltage measuring device BVM and the preceding filter FI are preferably co-located with or disposed in the vicinity of the solenoid valve. Alternatively, they can if necessary also be components of the control unit CON.

By providing in the forward path FCP of the digital control loop CLC, between its digital controller PC and its actuating element AC, a correction unit MUL with which a correction factor CF proportional to the reciprocal of the instantaneous, i.e. currently present, vehicle electrical system voltage VB is applied to the actuating signal CV output by the controller, negative effects of vehicle electrical system voltage fluctuations on the control action of the control loop are largely prevented from the outset. This is because this correction applies a kind of "inverse disturbance variable elimination" to the manipulated variable CV of the controller PC so that in particular vehicle electrical system voltage fluctuations or vehicle electrical system voltage ripple, which could be reflected in disturbances in the controlled variable AV and in the manipulated variable CV of the digital control loop CLC, can be compensated before they could have a negative effect on the measured controlled variable signal AV and therefore on the deviation signal CE. The setting of a desired current value for the respective actuator is therefore largely independent of the voltage level of the vehicle electrical system voltage. In this way, unwanted adjustments or mis-settings of the electric current AI for the solenoid valve MAV are largely prevented. Said "inverse disturbance variable feedforward" enables the correction unit MUL to instantaneously compensate any disturbance or fluctuation of the vehicle electrical system voltage VB occurring in the solenoid valve MAV. It is therefore only marginally necessary or even no longer necessary for the digital controller PC to intervene at all e.g. in the case of a suddenly i.e. abruptly changing vehicle electrical system voltage VB. By the correction unit MUL between the digital controller and the actuating element AC causing the correction factor CF proportional to the inverse of the currently present vehicle electrical system voltage VB to be applied to the actuating signal CV output by the digital controller PC, the digital control loop CLC can be made largely robust, i.e. stable, to vehicle electrical system voltage ripple or fluctuations while at the same time achieving a high dynamic response for rapid correction of intentional jumps in the setpoint current characteristic of the solenoid control valve. A fast response of the digital control loop CLC is advantageous in practice particularly for transmissions, preferably automatic transmissions. In the case of the latter, a fast controller response is required particularly during gearshifts involving a step-change setpoint current characteristic. On the one hand, the control loop can react with a high dynamic response, i.e. fast corrective action, to a wanted jump in the setpoint current. On the other hand, in the steady-state condition, i.e. in the event of level changes in the setpoint current which have a lower frequency than the fluctuation frequency of any vehicle electrical system voltage ripple occurring, it remains largely stable i.e. robust to said fluctuations in the vehicle's electrical system voltage.

Generalizing the control principle explained with reference to transmission control, it can also be advantageously applied, for catching vehicle electrical system voltage fluctuations, to other motor vehicle control units having a digital control loop for controlling the current of an electrical, in particular electrohydraulic actuator. For example, an actuating device for a hydraulic brake system or a pressure controller for a fuel injection system can be closed-loop or open-loop controlled according to the same functional principle.

Figure 2:
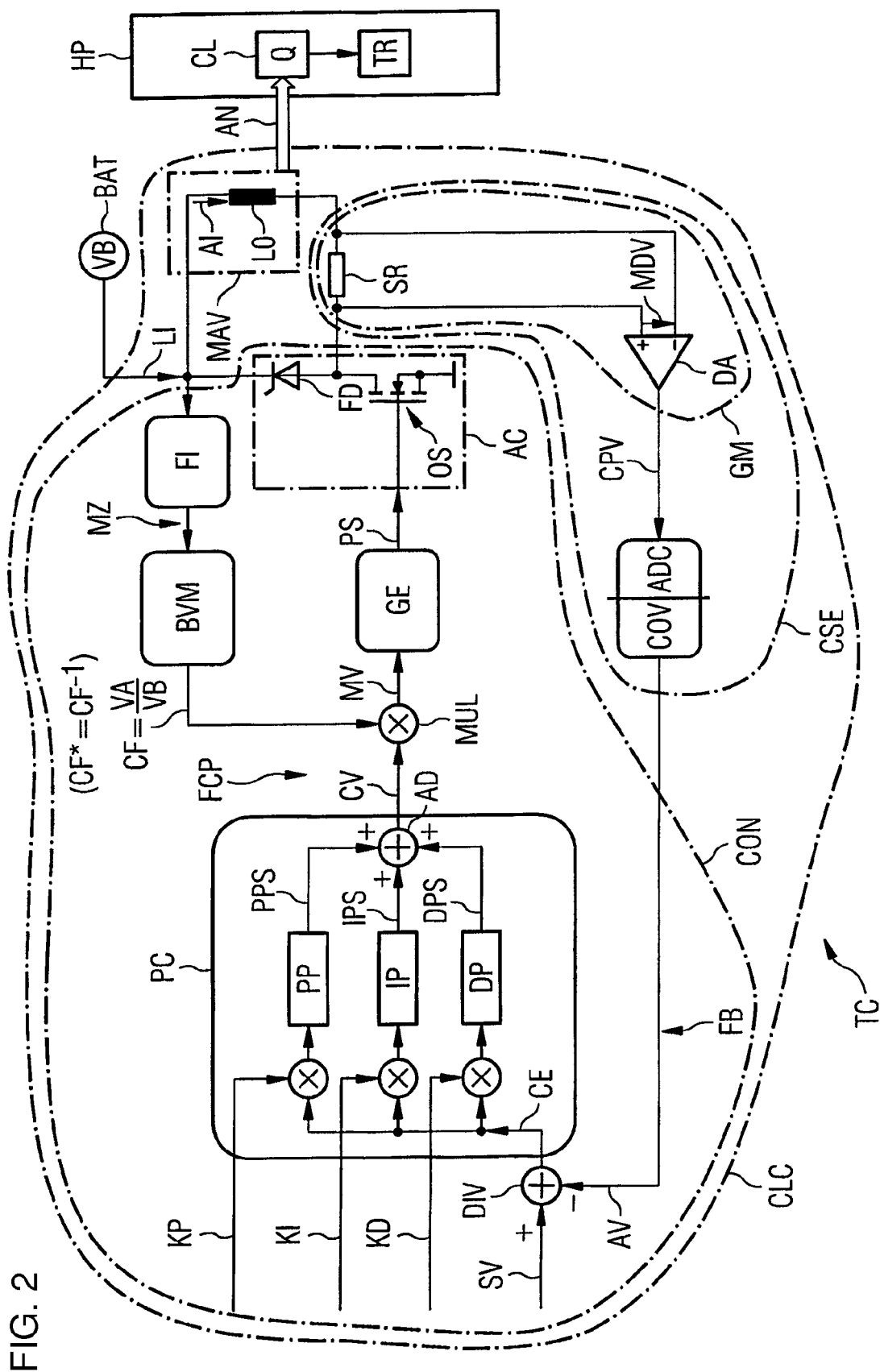

FIG. 2 schematically illustrates the digital control loop of the transmission control of FIG. 1 with equivalent circuit diagrams of individual components. As a variation of FIG. 1, the controller parameters KP, KI, KD are already applied on the input side to the deviation signal CE which is fed to the inputs of the P-component PP, the I-component IP and the D-component DP of the controller PC. The function and mode of operation of the controller PC are otherwise the same as in FIG. 1. In this exemplary embodiment, the electrical actuating element AC comprises a grounded transistor OS whose drain is connected to the anode of the freewheel diode FD. The freewheel diode FD is connected in parallel to the load LO of the magnet coil of the solenoid control valve MAV. The effect of the freewheel diode FD in the branch connected in parallel to the current branch with the load LO is that the coil current flows through the shunt resistor SR in both the "ON" and the "OFF" state of the transistor OS. Self-evidently, other configurations of the current (closed loop) controlled or current (open loop) controlled actuator are possible, as long as both phases of the PWM actuating signal can be measured via the shunt resistor. The measuring voltage MDV dropped across the latter is amplified by means of a differential amplifier DA in the measuring element GM and fed to the AD converter ADC of the current measuring device CSE as the voltage measuring signal CPV. The shunt resistor SR and differential amplifier DA together form the current measuring device GM.

Generalizing, the correction unit is expediently implemented as a multiplier which multiplies the actuating signal output by the controller by a correction factor which is proportional to the reciprocal of the instantaneous vehicle electrical system voltage VB. The correction unit multiplies the actuating signal CV output by the controller PC in particular by the correction factor CF according to the relation $$CF = \frac{VA}{VB},$$

where
  CF is the correction factor,
  VB is the vehicle electrical system voltage, and
  VA is a proportionality factor corresponding to the vehicle electrical system voltage at the operating point of the control loop for which the controller parameters of the controller are set in an optimized manner.

Alternatively, according to a useful variant, the correction unit can if necessary be implemented as a divider which divides the actuating signal output by the controller by a correction factor which is proportional to the [reciprocal of the] instantaneous vehicle electrical system voltage. In particular, the correction unit divides the actuating signal output by the controller by the correction factor CF* according to the relation $$CF^* = \frac{VB}{VA},$$

where
CF* is the inverse $CF^{-1}$ of the correction factor CF,
VB is the vehicle electrical system voltage, and
VA is a proportionality factor corresponding to the vehicle electrical system voltage at the operating point of the control loop for which the controller parameters of the controller are set in an optimized manner.

Figure 3A:
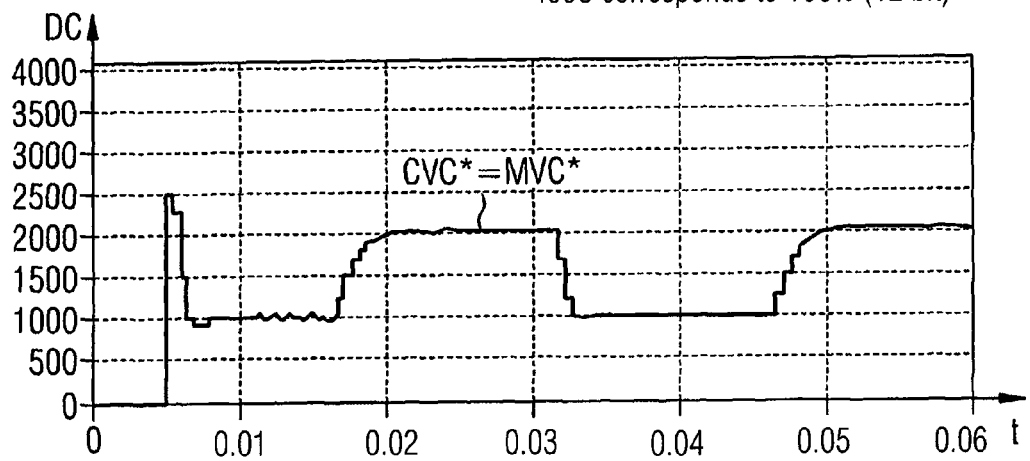
FIG. 3 shows, using graphical representations, an output signal of the controller and an input signal of the actuating element of a conventional control loop, as well as an actual value current characteristic additionally occurring in the solenoid control valve compared to a desired setpoint value current characteristic for given vehicle electrical system voltage fluctuations if the control loop of FIG. 1 or FIG. 2 incorporates no inventive inverse disturbance variable feedforward of the vehicle electrical system fluctuations.
Figure 3B:
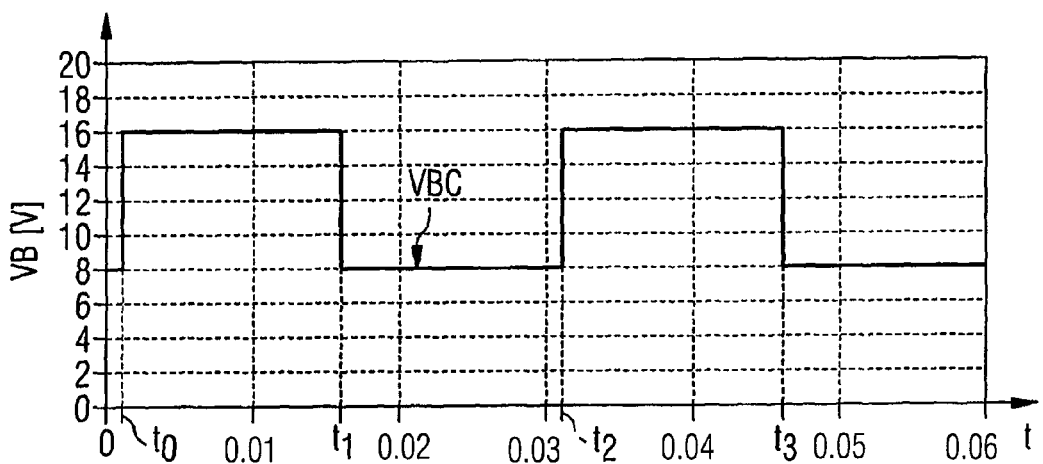
Figure 3C:
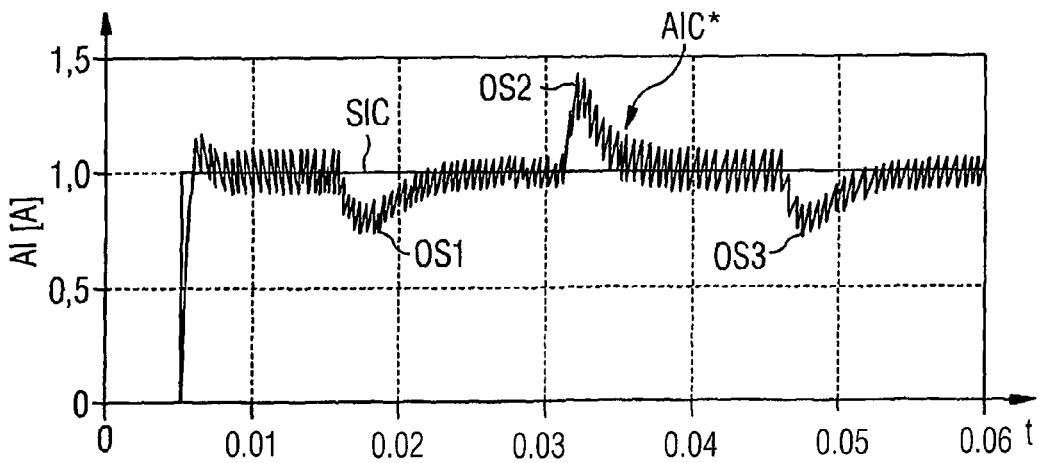

By way of example, a square-wave disturbance voltage characteristic VBC of the vehicle electrical system voltage VB is plotted as a function of time t in the middle graph in FIG. 3. The vehicle electrical system voltage fluctuates or more specifically changes between a lower voltage level of 8 volts and a higher voltage level of 16 volts. In particular, it jumps at instant t0 from 8 volts to 16 volts and drops abruptly again at instant t1 from 16 volts to 8 volts. Until instant t=2 it remains at this lower voltage level until, at t2, it changes abruptly again to the higher voltage level and remains there until t3. From instant t3 onwards, the vehicle electrical system voltage VB returns to the lower voltage level of 8 volts. The phase in which the vehicle electrical system voltage VB assumes the higher voltage level 16 volts is essentially of approximately the same length as the time interval during which the vehicle electrical system voltage assumes the lower voltage level. Without inverse disturbance variable feedforward by the correction unit MUL, the control loop CLC of FIG. 1 would attempt to correct the jumps or drops of the vehicle electrical system voltage VB. To do so, its controller PC would react by changing the duty cycle DC of its output signal CV, which is inversely proportional to the change in the vehicle electrical system voltage VB. Therefore, if the vehicle electrical system voltage jumps to the higher voltage level, the controller PC produces an output signal CV with a reduced PWM duty cycle inversely proportional thereto. Conversely, if the vehicle electrical system voltage VB drops to the lower voltage level, the duty cycle of the output voltage of the controller changes to a higher duty cycle level. For the square-wave vehicle electrical system voltage VBC there is produced a duty cycle characteristic CVC* of the output signal CV of the controller PC which is plotted in the upper duty cycle graph of FIG. 3. Here the duty cycle characteristic CVC* changes between a lower and a higher duty cycle level DC essentially inversely i.e. in the opposite direction, to the change in the vehicle electrical system voltage VB between the lower and the higher voltage level. The output signal CV is fed with this duty cycle characteristic to the actuating element AC, as indicated by the reference character MVC*. A current level characteristic AIC* is then produced which is schematically illustrated in the lower graph of FIG. 3. Whenever the voltage falls from the higher level to the lower level, there is a current drop compared to the setpoint current characteristic SIC=constant. In this exemplary embodiment, the drop in the coil current AI occurs e.g. somewhat delayed with respect to the voltage drops at instants t1 and t3. These current drops are labeled OS1 and OS3. Whenever an abrupt voltage rise occurs, as at instant t2, for example, the duty cycle DC for the output signal or more specifically the actuating signal CV of the controller is reduced in a delayed manner in a diametrically opposed manner thereto. This delay results in an unwanted transient current rise such as e.g. OS2 in the solenoid control valve.

Figure 4B:
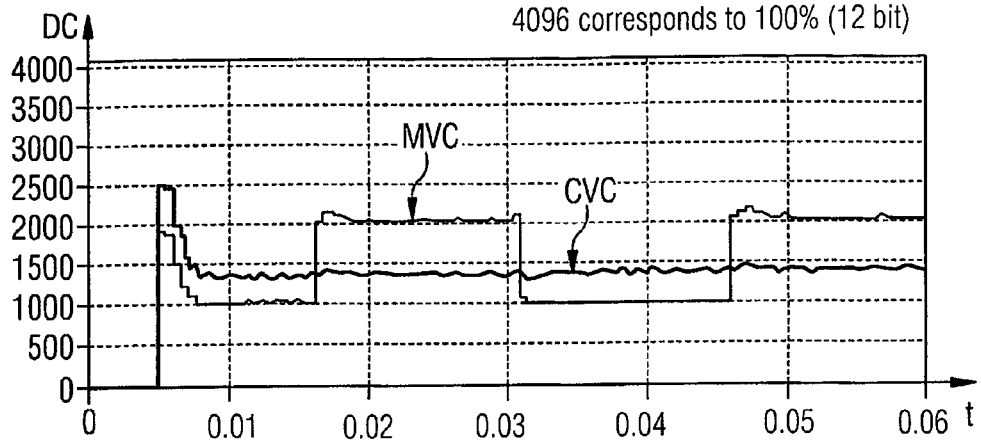
FIG. 4 shows, using graphical representations, an output signal of the controller, an input signal of the actuating element of the control loop of FIG. 1 or FIG. 2, and an actual value current characteristic additionally occurring compared to a desired setpoint current characteristic of the solenoid valve for given vehicle electrical system voltage fluctuations if a correction factor is additionally applied to the output manipulated variable of the controller of the transmission control unit of FIG. 1 or FIG. 2 by means of a correction unit.
Figure 4B:
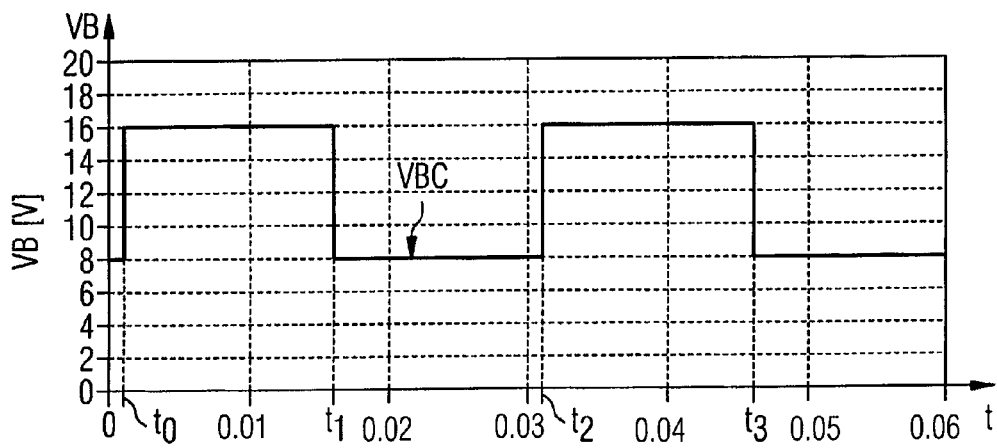
Figure 4C:
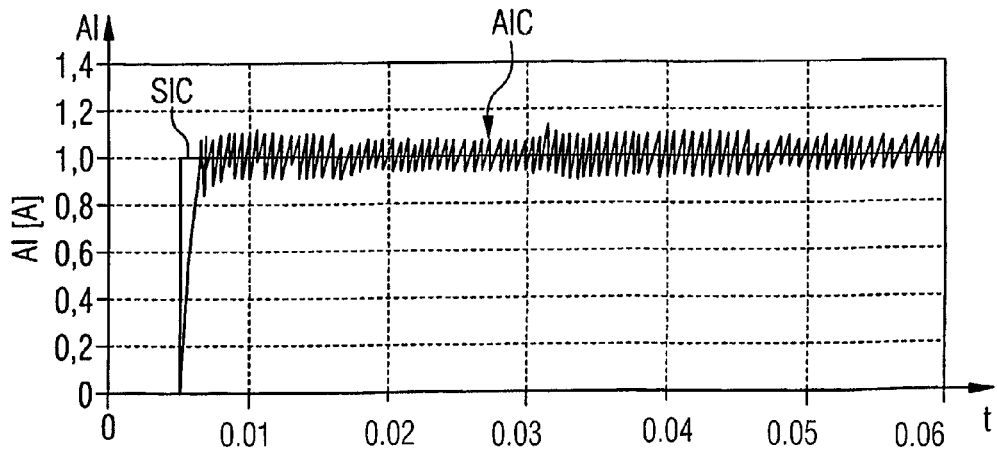

In contrast, in the case of the control loop in FIG. 1 with inverse disturbance variable elimination provided by the additional correction unit MUL, voltage jumps and falls, i.e. unwanted fluctuations in the vehicle electrical system voltage, can be largely caught. This is because a correction factor CF proportional to the reciprocal of the instantaneous vehicle electrical system voltage VB is now applied to the actuating signal CV output by the controller PC. This is shown by the top graph in FIG. 4 on the basis of the duty cycle DC at the output of the controller PC and at the input of the actuating element AC. The corrected manipulated variable signal generated by the correction unit MUL is denoted by MVC. It behaves in a diametrically opposed manner to fluctuations in the vehicle electrical system voltage VB according to the level characteristic VBC of the vehicle electrical system voltage graph in the middle of FIG. 4 which corresponds to that of FIG. 3. Whenever the vehicle electrical system voltage VB changes to the higher voltage level, the PWM duty cycle for the actuating signal CV output by the controller PC is reduced by the correction unit MUL in inverse proportion thereto. Conversely, whenever the vehicle electrical system voltage VB falls to the low voltage level, the PWM duty cycle of the actuating signal CV output by the controller is increased in inverse proportion thereto by the correction unit MUL. In this way, level fluctuations in the vehicle electrical system voltage are immediately equalized i.e. compensated before they can contribute to a change in the measured controlled variable AV and be converted into undesirable corrective action of the control loop. The output signal CV of the controller PC therefore remains essentially constant. This constant characteristic is denoted by CVC in the duty cycle DC versus time t graph in FIG. 4. This means that the controller is largely prevented from reacting to vehicle electrical system voltage fluctuations with a corresponding change in its output signal. Plotted in the lower graph of FIG. 4 is the actual value current characteristic AIC for the current AI of the solenoid control valve MAV. It is essentially congruent with a desired, here in particular largely constant setpoint current characteristic SIC. Compared to the actual value current characteristic AIC* of FIG. 3, with the control loop with inverse disturbance variable elimination, abrupt current falls and rises are largely prevented by the correction unit MUL of FIG. 1 if disturbances or fluctuations of the vehicle electrical system voltages occur.

Altogether, with inverse disturbance variable elimination, the disturbance of the desired current setting of the actuator due to voltage changes such as e.g. voltage jumps or even during a continuous fall or rise of the vehicle electrical system voltage—such as e.g. when a load is switched on in the motor vehicle—is much smaller then in the case without inverse disturbance variable elimination.

In the lower graph of FIG. 3 which shows the actual current characteristic AIC* as a reaction to the square-wave voltage characteristic VBC of the vehicle electrical system voltage VB, instead of the setpoint value jump from 0 to 1 amp, an unwanted overshoot occurs. The reason for this is that the controller parameters KP, KI, KD for the vehicle electrical system voltage VB=VA=12 volts have been optimized for this exemplary embodiment, but the vehicle electrical system voltage, just at the instant of the setpoint jump, is VB=16 volts. The controller parameters KP, KI, KD are therefore at this instant not ideally set, which at worst could lead to control instabilities. However, this problem is likewise largely solved, i.e. prevented, by the inverse disturbance variable elimination. The controller parameters KP, KI, KD are largely optimal for all vehicle electrical system voltages. In the case of wanted jumps in the setpoint current in the solenoid control valve, control system overshoot is largely prevented. It is sufficient for the controller parameters KP, KI, KD to have been optimized for an individual vehicle electrical system voltage.

In particular, the advantageous inverse disturbance variable feedforward can be used for current controllers e.g. in the field of transmission control systems, brake control systems, fuel injection systems, commutators of electric motors, or preferably hydraulic control systems. As a linear output stage would produce a very high power dissipation, the current is mainly adjusted here by means of a PWM output stage, the controller setting the duty cycle of the PWM output stage such that a desired current flows in the load, e.g. a solenoid control valve. The controller can be embodied as a pure P-controller, PI controller or PID controller. The correct duty cycle for the desired load is greatly dependent on the vehicle electrical system voltage, in particular the battery voltage and the load impedance. The vehicle electrical system voltage and load impedance are therefore regarded as disturbance variables, as a sudden change in these variables would cause a disturbance in the current flowing through the load. Without the inventive correction of the actuating signal output by the controller using a correction factor proportional to the reciprocal of the instantaneous vehicle electrical system voltage present, the controller would compensate the disturbing effect of vehicle electrical system voltage fluctuations by correspondingly correcting the duty cycle for the PWM generator.

Tests have shown that the load impedance of the actuator to be set does not normally present any particular problem, as the actuator's load to be controlled is mainly valves whose impedance only varies with temperature. However, as the temperature can only change slowly, the controller has sufficient time to adjust the duty cycle to the changed conditions without there being a perceptible disturbance in the output current.

In comparison, it has been found that the vehicle electrical system voltage, in particular the battery voltage, is much more problematic as a disturbance variable in the vehicle. In fact, the vehicle electrical system voltage may suddenly change if, for example, a powerful load is switched on or off. Without the disturbance variable correction according to the invention, a vehicle electrical system voltage which changes suddenly, in particular in an essentially discontinuous manner, would cause the two following problems:
a) a rapid change in the vehicle electrical system voltage would result in an unwanted change in the current in the load. This is because fluctuations in the vehicle electrical system supply voltage are also transmitted to the current flowing through the respective solenoid control valve, resulting in disturbances being applied to the controlled variable of its control loop. The digital control loop reacts to these disturbances with corrective action in such a way that changes in the current are brought about in inverse proportion to the change in the battery voltage. Said disturbances cannot be corrected again by the controller until after a certain time has elapsed. (see FIG. 3)
b) The controller parameters such as KP, KI, KD of the digital controller are normally set such that the closed control loop exhibits as high a dynamic performance as possible and therefore a fast step response. The optimum parameters KP, KI, KD for this purpose depend in an inversely proportional manner on the battery voltage. If e.g. the setpoint current for parameters optimized for low vehicle electrical system voltages increases abruptly, this can even result in control loop instability if the battery voltage increases markedly immediately before or during the jump.

By applying the inverse of the vehicle electrical system voltage to the manipulated variable signal of the controller, the two abovementioned problems are largely avoided. For this purpose, in particular the vehicle electrical system voltage, in particular the battery voltage, is measured continuously. The output of the digital controller, i.e. its manipulated variable signal, is preferably multiplied by a correction value which is proportional to the reciprocal of the instantaneous vehicle electrical system voltage. In this case the reciprocal of the instantaneous vehicle electrical system voltage is expediently multiplied by a proportionality factor corresponding to the vehicle electrical system voltage at an operating point for which the controller parameters such as KP, KI, KD are optimized. As the digital controller constitutes in a mathematical sense a linear system, multiplication of the output manipulated variable signal of the controller by the correction factor is equivalent to multiplying each individual one of the parameters such as KP, KI, KD. In so far as the controller operates on a continuous time basis, this also prevents any disturbance in the output current in the event of a sudden change in the vehicle electrical system voltage, because the output manipulated variable signal of the controller is multiplied by the correction factor VA/VB, i.e. the quotient of proportionality factor and vehicle electrical system voltage, thus compensating the disturbance instantaneously in the process section of the controlled system of the control loop. In the ideal case, it is therefore no longer necessary for the digital controller to intervene at all in the event of a suddenly changing vehicle electrical system voltage.

As PWM output stages operate on a discrete time basis, a new duty cycle can only be set once every PWM cycle. However, as the disturbance, i.e. the change in the vehicle electrical system voltage, does not normally occur in synchronism with the PWM frequency of the PWM generator, this disturbance can also only be compensated after a delay which can be between 0 s and max. one PWM period. As a disturbance may now also continue to occur periodically, it is therefore expedient to additionally insert appropriate lowpass filtering by means of a lowpass filter preceding vehicle electrical system voltage measurement or into vehicle electrical system voltage measurement. Said lowpass filter is used to prevent instability: in the event of periodic disturbances, the time-delayed compensation of the digital control loop introduces a phase shift which at high disturbance frequencies may produce positive feedback, thereby possibly exciting the controller to oscillate. Disturbance frequencies above the PWM frequency are therefore expediently filtered out by the lowpass filter. In the case of PWM output stages, a small output current disturbance in the event of a suddenly changing vehicle electrical system voltage is therefore unavoidable due to the time delay of the compensation. In order to minimize these disturbances, the PWM frequency and the cutoff frequency of the lowpass filter are expediently selected as high as possible. In any case, a significant improvement is to be achieved even for PWM output stages.

Whereas in the exemplary embodiment, a digital controller is referred to, the statements made there can also be advantageously applied to analog controllers in an analog control loop.

If the controller is of digital design, it is particularly advantageous if current measurement and vehicle electrical system voltage measurement are each performed by means of a sigma-delta ($\Sigma/\Delta$) converter. In this case, vehicle electrical system voltage measurement and lowpass filtering preferably constitute a functional unit. The two sigma-delta converters for the vehicle electrical system voltage and current measurement can also be synchronized to one another such that a minimal disturbance variable compensation delay occurs which does not result in instabilities.

Due to the fact that inverse disturbance variable feedforward control of the manipulated variables output by the controller using the reciprocal of the instantaneous vehicle electrical system voltage present allows immediate compensation of vehicle electrical system voltage fluctuations, performance or ride comfort penalties which have to be accepted in the case of hardware current controllers in transmission controls without vehicle electrical system voltage compensation are largely prevented. Particularly if the vehicle electrical system voltage is measured by hardware, the structure of the control loop with inverse disturbance variable feedforward advantageously permits very rapid intervention and dynamic compensation of any vehicle electrical system voltage disturbances. Even in the case of current controllers realized in software, measurement of the vehicle electrical system voltage and correction of the duty cycle according to the inventive principle by the software provides efficient disturbance variable compensation.

The invention claimed is:

1. A motor vehicle control device for a motor vehicle having a motor vehicle voltage source connected in a vehicle electrical system and an actuator, the control device comprising:
a controller forming a component of a control loop for controlling an electric current of the actuator, wherein a voltage of the vehicle electrical system voltage is applied to the actuator;
a correction unit connected in a forward path of the control loop between said controller and a downstream actuating element of the control loop, said correction unit causing a correction factor proportional to a reciprocal of an instantaneous vehicle electrical system voltage to be applied to an actuating signal output by said controller;
a voltage measuring device for measuring the vehicle electrical system voltage between the vehicle voltage source and the correction unit, said voltage measuring device having an input; and
a lowpass filter preceding said input of said voltage measuring device, said lowpass filter configured to filter out disturbance frequencies of the vehicle electrical system voltage above a PWM frequency of a PWM generator disposed downstream of said correction unit in the controller circuit and used for controlling the actuating element by way of pulse width modulation signals.

2. The motor vehicle control device according to claim 1, wherein the actuator is a solenoid valve.

3. The motor vehicle control device according to claim 2, wherein the actuator is a solenoid control valve.

4. The motor vehicle control device according to claim 1, wherein the actuator is operatively connected to a motor vehicle hydraulic device for an actuation thereof.

5. The motor vehicle control device according to claim 4, wherein the motor vehicle hydraulic device is a clutch, a transmission, a pressure controller for a fuel injection system, or a hydraulic brake.

6. The motor vehicle control device according to claim 1, wherein said controller is a dynamic digital controller.

7. The motor vehicle control device according to claim 1, wherein said controller is a PI or PID controller.

8. The motor vehicle control device according to claim 1, wherein said correction unit is a multiplier configured to apply a correction factor proportional to a reciprocal of an instantaneous vehicle electrical system voltage to the actuating signal output by said controller.

9. The motor vehicle control device according to claim 8, wherein said correction unit is a multiplier for multiplying an actuating signal output by said controller by the correction factor in accordance with the relationship $$CF = \frac{VA}{VB},$$

where
CF is the correction factor;
VB is the vehicle electrical system voltage; and
VA is a proportionality factor corresponding to the vehicle electrical system voltage at the operating point of the control loop for which the controller parameters of the controller are set in an optimized manner.

10. The motor vehicle control device according to claim 1, wherein said correction unit is a divider configured to divide the actuating signal output by said controller by a correction factor proportional to an instantaneous vehicle electrical system voltage.

11. The motor vehicle control device according to claim 10, wherein said correction unit is a divider configured to divide the actuating signal output by said controller by a correction factor in accordance with to the relationship $$CF^* = \frac{VB}{VA},$$

where
CF* is the correction factor;
VB is the vehicle electrical system voltage; and
VA is a proportionality factor corresponding to the vehicle electrical system voltage at the operating point of the control loop for which the controller parameters of the controller are set in an optimized manner.

12. The motor vehicle control device according to claim 1, wherein said lowpass filter is an integral part of the voltage measuring device.

13. The motor vehicle control device according to claim 1, wherein said voltage measuring device is an analog/digital converter.

14. The motor vehicle control device according to claim 13, wherein said voltage measuring device is a sigma-delta converter.

15. The motor vehicle control device according to claim 1, which comprises a current measuring device connected in the feedback path of the control loop, said current measuring device determining an actual current of the actuator and deriving therefrom a measured controlled variable.

16. The motor vehicle control device according to claim 15, which comprises a subtractor connected at the input of the control loop, said subtractor determining, from a difference between a given setpoint current and the measured controlled variable, a deviation signal and feeding the deviation signal to an input of the controller.

17. The motor vehicle control device according to claim 15, wherein said current measuring device is an analog/digital converter.

18. The motor vehicle control device according to claim 17, wherein said current measuring device is a sigma-delta converter.

19. A method of controlling an electric current of an actuator by way of a controller of a motor vehicle control device as a component of a control loop, the method which comprises:
applying a vehicle electrical system voltage of a motor vehicle voltage source to the actuator;
providing a correction unit in the forward path of the control loop between the controller and a downstream actuating element of the control loop, and causing with the correction unit a correction factor proportional to a reciprocal of an instantaneous vehicle electrical system voltage to be applied to the actuating signal output by the controller of the control loop;
providing a voltage measuring device for measuring the vehicle electrical system voltage between the vehicle voltage source and the correction unit, the voltage measuring device having an input; and
providing a lowpass filter preceding the input of the voltage measuring device, the lowpass filter configured to filter out disturbance frequencies of the vehicle electrical system voltage above a PWM frequency of a PWM generator disposed downstream of the correction unit in the controller circuit and used for controlling the actuating element by way of pulse width modulation signals.

20. A method of controlling an electric current of an actuator, the method which comprises:
providing a controller forming a component of a control loop for controlling an electric current of the actuator, wherein a voltage of the vehicle electrical system voltage is applied to the actuator;
applying a vehicle electrical system voltage of a motor vehicle voltage source to the actuator;
providing a correction unit connected in a forward path of the control loop between the controller and a downstream actuating element of the control loop, the correction unit causing a correction factor proportional to a reciprocal of an instantaneous vehicle electrical system voltage to be applied to an actuating signal output by the controller;
providing a voltage measuring device for measuring the vehicle electrical system voltage between the vehicle voltage source and the correction unit, the voltage measuring device having an input; and
providing a lowpass filter preceding the input of the voltage measuring device, the lowpass filter configured to filter out disturbance frequencies of the vehicle electrical system voltage above a PWM frequency of a PWM generator disposed downstream of the correction unit in the controller circuit and used for controlling the actuating element by way of pulse width modulation signals.

\* \* \* \* \*